(12) United States Patent
Shiomi

(10) Patent No.: US 11,752,960 B2
(45) Date of Patent: Sep. 12, 2023

(54) VEHICLE CONTROL APPARATUS AND POWER SOURCE SUPPLY CIRCUIT

(71) Applicant: DENSO CORPORATION, Kariya (JP)

(72) Inventor: Tsuyoshi Shiomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/885,608

(22) Filed: Aug. 11, 2022

(65) Prior Publication Data

US 2022/0379828 A1 Dec. 1, 2022

Related U.S. Application Data

(63) Continuation of application No. 16/739,794, filed on Jan. 10, 2020, now Pat. No. 11,485,301, which is a
(Continued)

(30) Foreign Application Priority Data

Jul. 19, 2017 (JP) .................................. 2017-140058
Jul. 13, 2018 (JP) .................................. 2018-133232

(51) Int. Cl.
*B60R 16/033* (2006.01)
*B60K 35/00* (2006.01)
(Continued)

(52) U.S. Cl.
CPC .............. *B60R 16/033* (2013.01); *B60K 5/00* (2013.01); *B60K 35/00* (2013.01); *B60L 1/00* (2013.01); *B60R 16/02* (2013.01); *G07C 5/008* (2013.01); *G07C 5/08* (2013.01); *B60K 2370/152* (2019.05); *B60K 2370/1529* (2019.05);
(Continued)

(58) Field of Classification Search
CPC ........... G07C 5/08; G07C 5/008; G06F 19/00; G06F 1/26; B60R 16/033; B60R 16/02; B60K 35/00; B60K 2370/152; B60K 2370/1529; B60K 2370/164;
(Continued)

(56) References Cited

U.S. PATENT DOCUMENTS

| 5,986,350 A | 11/1999 | Hirano |
| 6,694,235 B2 | 2/2004 | Akiyama |

(Continued)

FOREIGN PATENT DOCUMENTS

| JP | H10070843 A | 3/1998 |
| JP | 2003019931 A | 1/2003 |

(Continued)

OTHER PUBLICATIONS

U.S. Appl. No. 16/739,794, filed Jan. 10, 2020, Tsuyoshi Shiomi.

*Primary Examiner* — Arnold M Kinkead
(74) *Attorney, Agent, or Firm* — Harness, Dickey & Pierce, P.L.C.

(57) ABSTRACT

A power source supply circuit supplies an output power source of a battery to a vehicle control apparatus that includes a first instrument control portion that selectively receives a voltage applied to a first power source input portion or a voltage applied to a second power source input portion as an operation voltage and a second instrument control portion that receives a voltage applied to a second power source input portion or a third power source input portion as the operation voltage.

13 Claims, 8 Drawing Sheets

Related U.S. Application Data continuation of application No. PCT/JP2018/026894, filed on Jul. 18, 2018.

(51) Int. Cl.
  *B60L 1/00* (2006.01)
  *B60R 16/02* (2006.01)
  *G07C 5/00* (2006.01)
  *B60K 5/00* (2006.01)
  *G07C 5/08* (2006.01)

(52) U.S. Cl.
  CPC .. *B60K 2370/164* (2019.05); *B60K 2370/167* (2019.05); *B60K 2370/176* (2019.05)

(58) Field of Classification Search
  CPC ........ B60K 2370/167; B60K 2370/176; B60L 1/00; H02J 7/00
  USPC ............. 307/9.1, 10.1; 701/33, 29; 370/241; 318/139
  See application file for complete search history.

(56) References Cited

U.S. PATENT DOCUMENTS

| | | |
|---|---|---|
| 9,753,808 B2 | 9/2017 | Eiro et al. |
| 2003/0009271 A1 | 1/2003 | Akiyama |
| 2004/0124705 A1 | 7/2004 | Nozawa et al. |
| 2010/0244560 A1 | 9/2010 | Sato et al. |
| 2011/0115287 A1 | 5/2011 | Morita et al. |
| 2016/0004600 A1 | 1/2016 | Eiro et al. |
| 2016/0328272 A1 | 11/2016 | Ahmed et al. |
| 2017/0113612 A1 | 4/2017 | Taguchi et al. |
| 2017/0178425 A1* | 6/2017 | Ohno ..................... G07C 5/008 |

FOREIGN PATENT DOCUMENTS

| | | |
|---|---|---|
| JP | 2004-189055 A | 7/2004 |
| JP | 4053447 B2 | 2/2008 |
| JP | 2008179221 A | 8/2008 |
| JP | 2014115703 A | 6/2014 |
| JP | 2014-234000 A | 12/2014 |
| JP | 2016-020931 A | 2/2016 |
| JP | 2017-507398 A | 3/2017 |

* cited by examiner

FIG. 5

| | REQUIREMENT | | | | CHARACTERISTIC | | |
|---|---|---|---|---|---|---|---|
| | POWER SOURCE SYSTEM | OPERATION VOL | OPERATION CR | QUALITY | CONSUMER TECHNOLOGY | GENERATION ADVANCE |
| DISPLAY CONTROL | TWO SYSTEMS (IG, +B) | 4V OR MORE | 2A OR LESS | HIGH | LOW | LOW |
| INFOTAINMENT CONTROL | ONE SYSTEM (+B) | 10V OR MORE | 15A OR LESS | MIDDLE | HIGH | HIGH |

VEHICLE CONTROL APPARATUS AND POWER SOURCE SUPPLY CIRCUIT

CROSS REFERENCE TO RELATED APPLICATIONS

The present application is a continuation application of U.S. patent application Ser. No. 16/739,794 filed on Jan. 10, 2020 which is a continuation application of International Patent Application No. PCT/JP2018/026894 filed on Jul. 18, 2018, which designated the U.S. and claims the benefit of priority from Japanese Patent Application No. 2017-140058 filed on Jul. 19, 2017, and Japanese Patent Application No. 2018-133232 filed on Jul. 13, 2018. The entire disclosures of all of the above applications are incorporated herein by reference.

TECHNICAL FIELD

The present disclosure relates to a vehicle control apparatus and a power source supply circuit.

BACKGROUND

In a vehicle, various vehicle control apparatuses that control operations of various in-vehicle instruments are mounted. Multiple systems as power source supply systems from a battery to an in-vehicle instrument are provided since requirements and characteristics required by the in-vehicle instrument corresponding to the control target are different depending on the controlled in-vehicle instrument. Specifically, an ignition system in which an output power source of the battery is supplied via a switch in cooperation with an ignition state and a battery system in which the output power source of the battery is directly supplied without the switch described above are provided.

SUMMARY

One example of the present disclosure to provide a vehicle control apparatus and a power source supply circuit capable of appropriately integrating a control function of a safety type in-vehicle instrument into a non-safety type in-vehicle instrument while maintaining a required operation of the safety type in-vehicle instrument.

According to one example embodiment, a vehicle control apparatus includes: a first power source input portion connected to a first power source supply system; a second power source input portion connected to a second power source supply system; a first instrument control portion that controls an operation of a first in-vehicle instrument; and a second instrument control portion that controls an operation of a second in-vehicle instrument, According to another example embodiment, a power source supply circuit supplies an output power source of a battery to a vehicle control apparatus that includes a first instrument control portion that selectively receives a voltage applied to a first power source input portion or a voltage applied to a second power source input portion as an operation voltage and a second instrument control portion that receives a voltage applied to a second power source input portion or a third power source input portion as the operation voltage.

BRIEF DESCRIPTION OF DRAWINGS

The above and other objects, features and advantages of the present disclosure will become more apparent from the following detailed description made with reference to the accompanying drawings. In the drawings:

FIG. 5 is a diagram showing requirements and characteristics of the display control portion and the infotainment control portion;

DESCRIPTION OF EMBODIMENTS

Figure 1:
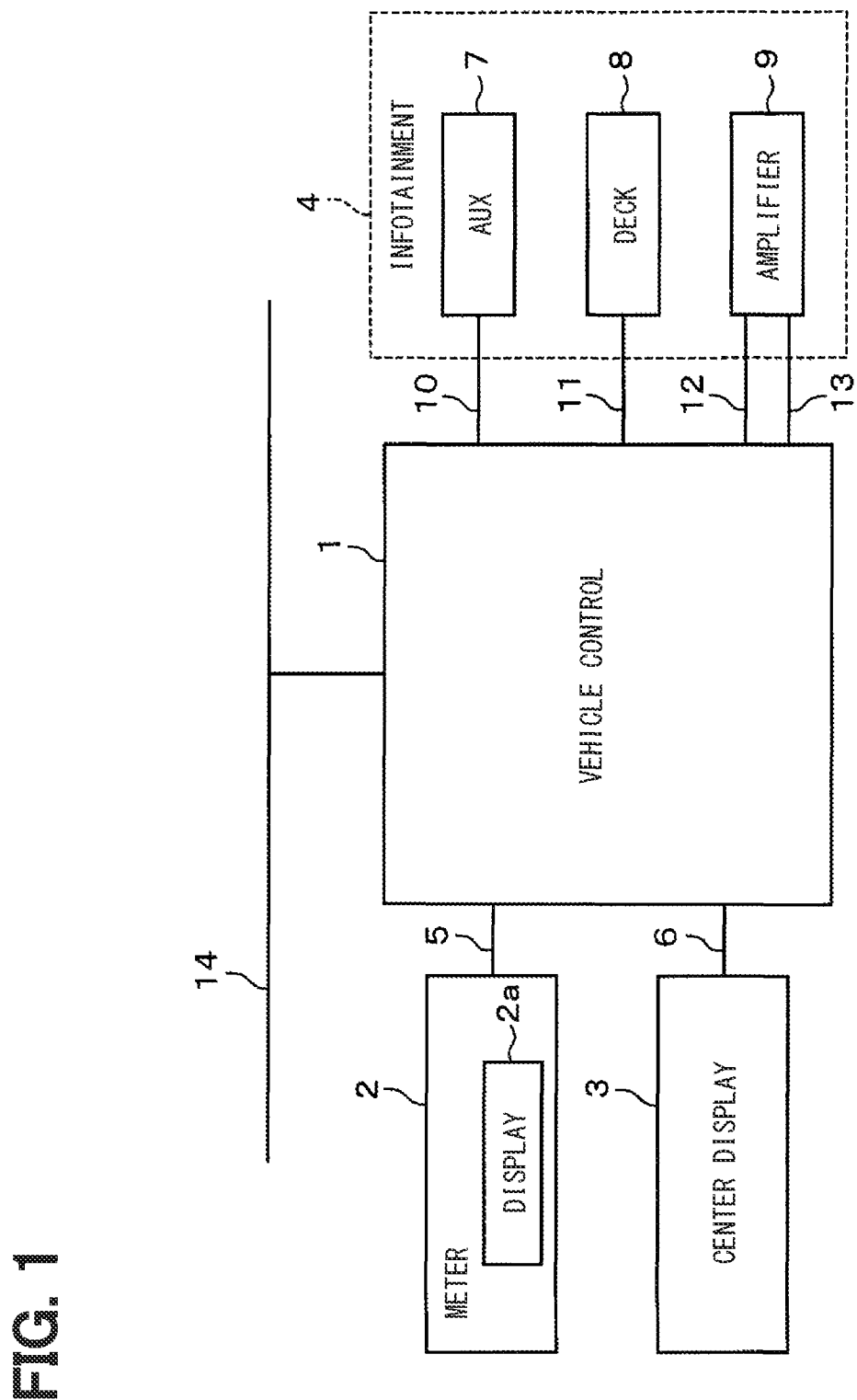
FIG. 1 is a diagram showing a vehicle control apparatus and a peripheral configuration according to a first embodiment.

In a vehicle, various vehicle control apparatuses that control operations of various in-vehicle instruments are mounted. Multiple systems as power source supply systems from a battery to an in-vehicle instrument are provided since requirements and characteristics required by the in-vehicle instrument corresponding to the control target are different depending on the controlled in-vehicle instrument. Specifically, an ignition system in which an output power source of the battery is supplied via a switch in cooperation with an ignition state and a battery system in which the output power source of the battery is directly supplied without the switch described above are provided.

For example, in a safety type in-vehicle instrument requiring safety or security rather than convenience or comfort of a meter device, or the like, it is required to perform a predetermined operation not only in an on-state of the ignition but also in an off-state of the ignition. Therefore, the safety type in-vehicle instrument is connected so as to receive the power source supply from both of the ignition system and the battery system. The operation state is switchable depending on a case where the ignition turns on and thereby both of the ignition system and the battery system are in an energization state or a case where the ignition turns off and thereby only the battery system is in the energization state.

In recent years, integration of control functions has been studied for the purpose of reducing the number of parts and strengthening cooperation between multiple in-vehicle instruments. Therefore, for example, it may be considered that a display control function of a meter device conventionally mounted in a meter module with a display device is integrated into a car navigation device similarly having a display control function.

By the way, the in-vehicle instrument are roughly classified into the described above safety type in-vehicle instrument and a non-safety type in-vehicle instrument such as, for example, the car navigation device requiring the convenience or the comfort rather than the safety or the security. As described above, many safety type in-vehicle instruments are connected so as to receive the power source supply from both of the ignition system and the battery system. By contrast, many non-safety in-vehicle instruments are not assumed to operate in the off-state of the ignition system. Therefore, many non-safety type in-vehicle instruments are connected so as to receive the power source supply from the battery system and not to receive the power source supply from the ignition system. Therefore, for example, it may be considered that, when the display control function of the meter device is integrated into the conventional car navigation device, the required operation of the conventional meter device is not implementable.

One example of the present disclosure to provides a vehicle control apparatus and a power source supply circuit capable of appropriately integrating a control function of a safety type in-vehicle instrument into a non-safety type in-vehicle instrument while maintaining a required operation of the safety type in-vehicle instrument.

According to one example embodiment, a first power source input portion is connected to a first power source supply system that receives power source supply in cooperation with an ignition state of a vehicle. A second power source input portion is connected to a second power source supply system that receives the power source supply regardless of the ignition state. A first instrument control portion controls an operation of a first in-vehicle instrument connected to both of the first power source supply system and the second power source supply system. A second instrument control portion controls an operation of a second in-vehicle instrument that is not connected to the first power source supply system and is connected to the second power source supply system. The first instrument control portion receives an operation power source from both of the first power source input portion and the second power source input portion.

While the first instrument control portion controlling the operation of the first in-vehicle instrument and the second instrument control portion are integrated, the operation power source is supplied from both of the first power source input portion and the second power source input portion to the first instrument control portion. The first instrument control portion is set to a safety type instrument control portion controlling the operation of a safety type in-vehicle instrument. Thereby, it may be possible to switch an operation when both of the first power source supply system and the second power source supply system are in an energization state and when only the second power source supply system is in the energization state. The second instrument control portion is set to a non-safety type instrument control portion controlling the operation of a non-safety type in-vehicle instrument. Thereby, it may be possible to appropriately integrate a control function of the safety type in-vehicle instrument in to the non-safety type in-vehicle instrument while maintaining the required operation of the safety type in-vehicle instrument.

According to another example embodiment, a power source supply circuit supplies an output power source of a battery to a vehicle control apparatus that includes a first instrument control portion that selectively receives a voltage applied to a first power source input portion or a voltage applied to a second power source input portion as an operation voltage and a second instrument control portion that receives a voltage applied to a second power source input portion as the operation voltage. A first power source supply system includes a first energization member that is detachable, and supplies the output voltage of the battery to the first power source input portion in cooperation with an ignition state of a vehicle in a state where the first energization member is attached. A second power source supply system includes a section energization member that is detachable, and supplies the output voltage of the battery to the second power source input portion regardless of the ignition state of the vehicle in a state where the second energization member is attached.

Even when the second energization member is not attached, a voltage applied to the first power source input portion is set to the operation voltage and thereby the operation voltage is supplied to the first instrument control portion. The second energization member is detached, and thereby a supply route of the power source by the second power source supply system is interrupted. It may be possible to appropriately secure the operation voltage of the first instrument control portion while preventing battery increase caused by a dark current from being increased.

Furthermore, according to another example embodiment, an output power source of a battery is supplied to a vehicle control apparatus. The vehicle control apparatus includes a first instrument control portion that selectively receives a voltage applied to a first power source input portion or a voltage applied to a second power source input portion as an operation voltage and a second instrument control portion that receives a voltage applied to a third power source input portion as the operation voltage. A first power source supply system includes a first energization member that is detachable, and supplies the output voltage of the battery to the first power source input portion in cooperation with an ignition state of a vehicle in a state where the first energization member is attached. One second power source supply system includes a section energization member that is detachable, and supplies the output voltage of the battery to the second power source input portion regardless of the ignition state of the vehicle in a state where the second energization member is attached. Another one second power source supply system includes a third energization member that is detachable, and supplies the output voltage of the battery to the third power source input portion regardless of the ignition state of the vehicle in a state where the third energization member is attached.

Even when the second energization member is not attached, a voltage applied to the first power source input portion is set to the operation voltage and thereby the operation voltage is supplied to the first instrument control portion. The second energization member is detached, and thereby a supply route of the power source by one second power source supply system is interrupted. It may be possible to appropriately secure the operation voltage of the first instrument control portion while preventing battery increase caused by a dark current from being increased. Attachment of the third energization member is maintained. Thereby, it may be possible to maintain connection of the supply route of the power source by another second power source supply system, and not only appropriately secure the operation voltage of the first instrument control portion but also appropriately secure the operation power source of the second instrument control portion.

First Embodiment

A first embodiment will be described with reference to FIG. 1 to FIG. 8.

A vehicle control apparatus 1 integrates a function of controlling an operation of a safety type in-vehicle instrument and a function of controlling an operation of a non-safety type in-vehicle instrument, and controls a HMI (Human Machine Interface).

The safety type in-vehicle instrument corresponds to an in-vehicle instrument having a characteristic requiring safety or security rather than convenience or comfort. The safety type in-vehicle instrument corresponds to an in-vehicle instrument that provides high safety and high security to a driver by normally operating. For example, the safety type in-vehicle instrument corresponds to a meter device that displays a vehicle traveling state, a center display device and a HUD (Head-Up Display) that displays a vehicle state including the vehicle traveling state, an electronic mirror that shows a vehicle peripheral image photographed by a camera instead of a conventional mirror, or the like.

The non-safety type in-vehicle instrument corresponds to an in-vehicle instrument having a characteristic requiring the convenience or the comfort rather than the safety or the security. The non-safety type in-vehicle instrument corresponds to an in-vehicle instrument that provides high convenience and high comfort to the driver by normally operating. For example, the non-safety type in-vehicle instrument corresponds to a car navigation device that performs route guidance or the like, an audio device that outputs music, radio broadcasts, or the like, an infotainment device in which the car navigation device and the audio device are integrated, or the like.

Hereinafter, in the present embodiment, the meter device and the center display device will be exemplified as the safety type in-vehicle instrument. The infotainment device will be exemplified as the non-safety type in-vehicle instrument. A configuration of targeting the in-vehicle instrument having the characteristics of both of the safety type and the non-safety type and controlling the operation of the in-vehicle instrument may be also implemented. For example, when the center display device corresponds to the in-vehicle instrument having a safety type function block and a non-safety type function block, an operation of the safety type function block may be controlled as the safety type in-vehicle instrument, and an operation of the non-safety type function block may be controlled as the non-safety type in-vehicle instrument.

As shown in FIG. 1, the vehicle control apparatus 1 is connected to a meter device 2 (corresponding to a first in-vehicle instrument, the safety type in-vehicle instrument, and a display instrument) that displays various images, a center display device 3 (corresponding to the first in-vehicle instrument, the safety type in-vehicle instrument, and the display instrument) that displays the various images, and an infotainment device 4 (corresponding to a second infotainment device, the non-safety type in-vehicle instrument, and an application execution instrument) that executes various applications. The vehicle control apparatus 1 and the meter device 2 are connected via an image signal line 5. A control signal or an image signal transmitted from the vehicle control apparatus 1 is transferred to the meter device 2 via the image signal line 5. The image signal line 5 corresponds to, for example, a coaxial cable. The vehicle control apparatus 1 and the center display device 3 are connected to an image signal line 6. The control signal or the image signal transmitted from the vehicle control apparatus 1 is transferred to the center display device 3 via the image signal line 6. The image signal line 6 corresponds to, for example, a coaxial cable, or a shield twist pair cable.

The infotainment device 4 includes an AUX 7, a deck 8, an amplifier 9. The vehicle control apparatus 1 and the AUX 7 are connected via an audio signal line 10. An audio signal transmitted from the vehicle control apparatus 1 is transferred to the AUX 7 via the audio signal line 10. The vehicle control apparatus 1 and the deck 8 are connected via an audio signal line 11. The control signal or the audio signal transmitted from the vehicle control apparatus 1 is transferred to the deck 8 via the audio signal line 11. The audio signal line 11 corresponds to, for example, an USB (Universal Serial Bus) cable. The vehicle control apparatus 1 and the amplifier 9 are connected via a CAN (Controller Area Network, a registered trademark) 12 and an audio signal line 13. The control signal transmitted from the vehicle control apparatus 1 is transferred to the amplifier 9 via the CAN 12. The audio signal transmitted from the vehicle control apparatus 1 is transferred to the amplifier 9 via the audio signal line 13. The vehicle control apparatus 1 is connected to various sensors mounted in the vehicle, various ECUs (Engine Control Unit), or the like via a CAN 14 configuring a vehicle network. The various signals transmitted from the vehicle control apparatus 1 are transferred to the various sensors or the various ECUs via the CAN 14. The various signals transmitted from the various sensors or the various ECUs are transferred to the vehicle control apparatus 1 via the CAN 14.

Figure 2:
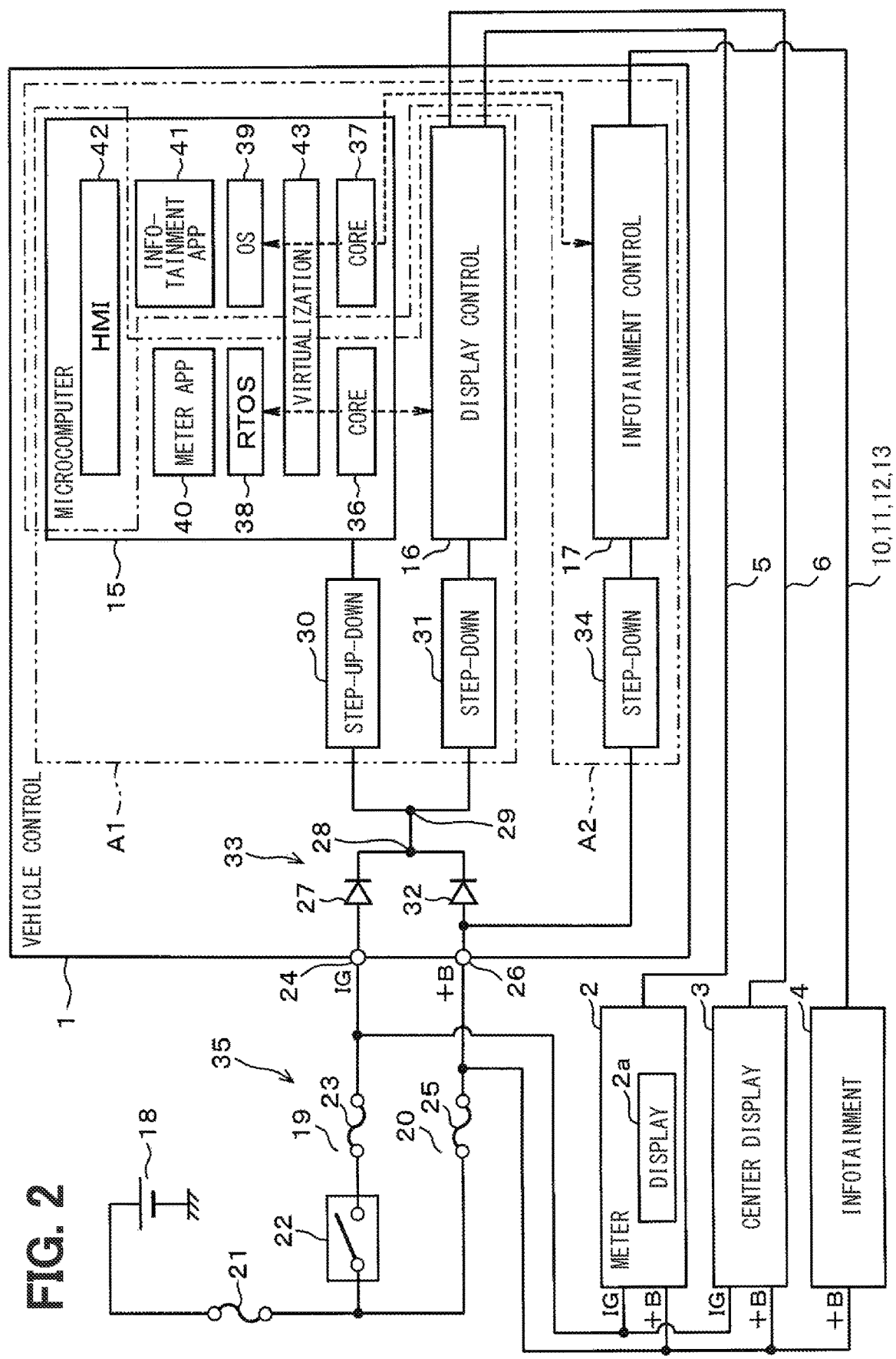
FIG. 2 is a functional block diagram showing an internal configuration of the vehicle control apparatus and a power source supply system.

As shown in FIG. 2, the vehicle control apparatus 1 includes a microcomputer 15 (corresponding to an operation portion), a display control portion 16 (corresponding to a first infotainment control portion), and an infotainment control portion 17 (corresponding to a second instrument control portion, and a function control portion) The display control portion 16 and the infotainment control portion 17 are placed in a housing of the vehicle control apparatus 1, are integrated in the housing of the vehicle control apparatus 1. Here, the integration may mean that a hardware configuring the display control portion 16 and a hardware configuring the infotainment control portion 17 are placed in the same substrate, or each of the hardwares is placed in a different substrate from each other. Further, the integration may mean that the hardwares coexist in the housing.

Figure 3:
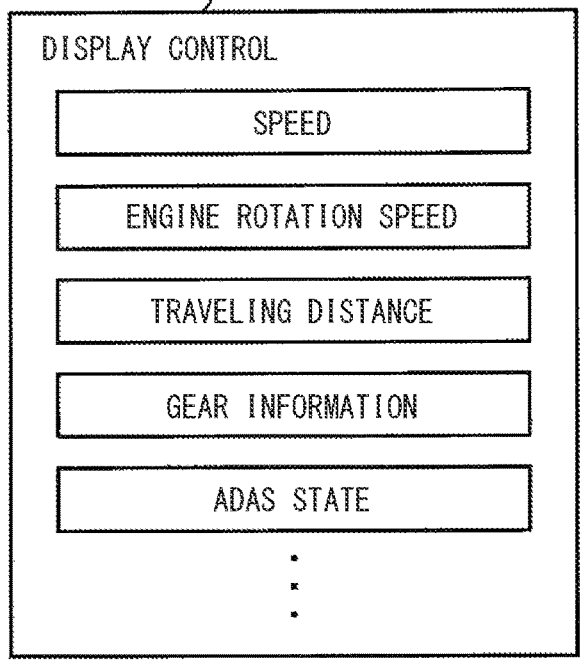
FIG. 3 is a diagram showing functions of a display control portion.

The display control portion 16 corresponds to a function block that performs display control of various vehicle information. In the display control portion 16, various electronic components necessary for the display control are mounted. That is, as shown in FIG. 3, as the display control of the various vehicle information, the display control portion 16 performs, for example, display control for speed, display control for an engine rotation speed, display control for travelling distance, display control for gear information, display control for an ADAS (Advanced Driver-Assistance Systems) state, or the like. The display control portion 16 performs generation of an image including the various vehicle information, determination of an image display timing, determination of an image delete timing, or the like in accordance with a command input from the microcomputer 15. The display control portion 16 transmits the control signal or the image signal to a display 2a of the meter device 2 or the center display device 3, and performs the display control of the various vehicle information. When receiving the control signal or the image signal from the display control portion 16, the display 2a of the meter device 2 or the center display device 3 displays the various vehicle information in accordance with the received control signal or the received image signal. The vehicle information targeted for the display control may be not limited to the vehicle information exemplified in FIG. 3.

Figure 4:
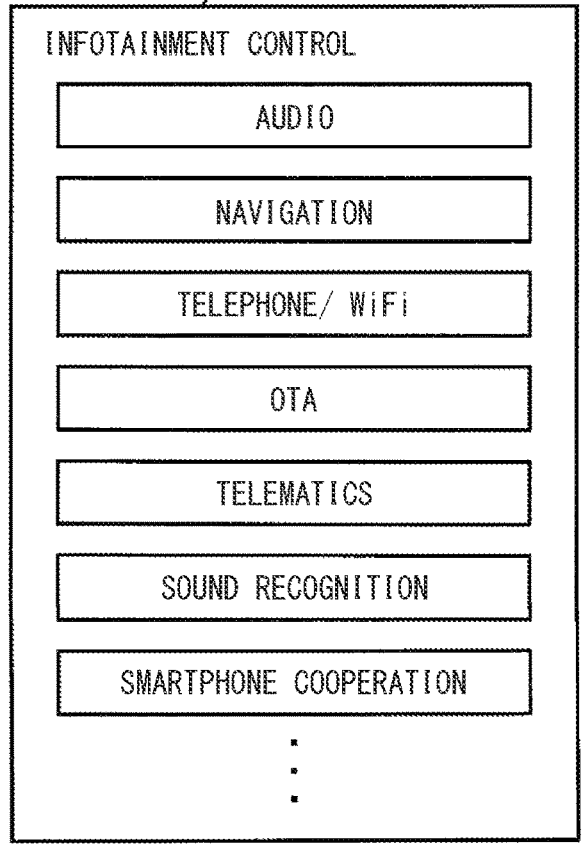
FIG. 4 is a diagram showing functions of an infotainment control portion.

The infotainment control portion 17 corresponds to a function block that performs function controls of various applications. In the infotainment control portion 17, various electronic components necessary for the function control are mounted. That is, as shown in FIG. 4, the infotainment control portion 17 performs, as the function controls of the various applications, audio function control, navigation function control, telephone-WiFi (registered trademark) function control, OTA (Over The Air) function control, telematics function control, audio recognition function control, smartphone cooperation function control, or the like, for example. In accordance with the command from the microcomputer 15, the infotainment control portion 17 performs determination of an activation timing of the various applications, determination of a stop timing of the function, or the like. The infotainment control portion 17 transmits the control signal to the infotainment device 4, and performs the function controls of the various applications. When receiving the control signal from the infotainment control portion 17, the infotainment device 4 performs operations such as route guidance, audio output of music or radio broadcast, or the like, in accordance with the received control signal. The application targeted for the function control may be not limited to the application exemplified in FIG. 4.

In the vehicle control apparatus 1, a connector (not shown) is placed. The output power source of a battery 18 mounted in the vehicle is supplied via the connector. As a power source supply system from the battery 18 to the vehicle control apparatus 1, an ignition system 19 (corresponding to a first power source supply system) in which the output power source of the battery 18 is supplied via the switch in cooperation with an ignition state, and a battery system 20 (corresponding to a second power source supply system) in which the output power source of the battery 18 is directly supplied without the switch described above are provided. The ignition system 19 and the battery system 20 correspond to the two power source supply systems 19 and 20. Here, the ignition may be not limited to the vehicle having an internal combustion engine, and include a ready-on state or a power-on state indicating a start preparation completion state of, for example, an electric vehicle (EV) or a hybrid vehicle (HV). In the present embodiment, the power source supply system in which the power source supply is performed in cooperation with these states may be also collectively referred to as an ignition system.

A positive terminal of the battery 18 is connected to the two power source supply systems 19 and 20 via a detachable fuse 21. A negative terminal of the battery 18 is grounded. The ignition system 19 includes a switch 22 in cooperation with a key switch that can be operated by a user and a detachable fuse 23 (corresponding to a first energization member). The ignition system 19 is connected to an ignition power source input terminal 24 (corresponding to a first power source input portion) of the vehicle control apparatus 1, the meter device 2, and the center display device 3. The key switch corresponds to a switch enabling the user to switch operation states of the on-state, an accessory state, the off-state, and a start state. When the user switches the operation state to the on-state to the start state, the key switch is turned on and the operation state is switched to the energization state. The key switch is turned on and the current state is switched to the energization state, and thereby the output power source of the battery 18 is supplied, as an ignition power source IG, to the ignition power source input terminal 24 of the vehicle control apparatus 1, the meter device 2, and the center display device 3 via the switch 22 and the fuse 23. That is, on a condition that the fuses 21 and 23 are normally installed to be in the energization state and the user switches the operation state of the key switch to the on-state or the start state, the voltage of the ignition power source IG is supplied to the ignition power source input terminal 24 of the vehicle control apparatus 1, the meter device 2, and the center display device 3.

The battery system 20 includes a detachable fuse 25 (corresponding to a second energization member), and is connected to a battery power source input terminal 26 (corresponding to a second power source input portion) of the vehicle control apparatus 1, the meter device 2, the center display device 3, and the infotainment device 4. Regardless of the state of the key switch, the output power source of the battery 18 is supplied, as a battery power source +B, to the battery power source input terminal 26 of the vehicle control apparatus 1, the meter device 2, the center display device 3, and the infotainment device 4 via the fuse 25. That is, regardless of whether the user switches the key switch to any operation state, only on a condition that the fuses 21 and 25 are normally installed to be in the energization state, the voltage of the battery power source +B is supplied to the battery power source input terminal 26 of the vehicle control apparatus 1, the meter device 2, the center display device 3, and the infotainment device 4.

For example, when the vehicle is loaded on a ship and transported, the fuse 25 of the battery system 20 may be detached in order to prevent the battery from being increased due to dark current flowing in the in-vehicle instrument. However, in order that the vehicle self-travels when the vehicle is loaded on or unloaded from the ship, it may be essential that the meter device 2 or the center display device 3 operates. That is, the meter device 2 or the center display device 3 may be essential to operate during transportation, and therefore is connected so as to receive the power source from not only the battery system 20 and also the ignition system 19. By contrast, the infotainment device 4 may be not essential to operate during the transportation, and therefore not essential to receive the power source supply from the ignition system 19. The infotainment device 4 is connected so as to receive the power source supply from only the battery system 20. That is, in the present embodiment, the fuse 25 of the battery system 20 is detached, and thereby a power source supply route from the battery 18 to the in-vehicle instrument can be interrupted. The battery can be prevented from increasing due to the dark current. An operation power source for the meter device 2 or the center display device 3 can be securable. The operation of the meter device 2 or the center display device 3 can be operated when the vehicle self-travels.

In the present embodiment, the meter device 2 and the center display device 3 are exemplified as the safety type in-vehicle instrument described above. Therefore, a configuration in which both operations of the meter device 2 and the center display device 3 when the vehicle self-travels in a case where the vehicle is loaded or unloaded is described. By contrast, for example, in a case of a configuration in which the meter device 2 is specialized in displaying safety type information such as speed and the center display device 3 is specialized in displaying non-safety type information in cooperation with the infotainment device 4, only the operation of the meter device 2 may be essential when the vehicle self-travels at the loading or the unloading of the vehicle. That is, not only the configuration in which both operations of the meter device 2 and the center display device 3 are essential when the vehicle self-travels in a case where the vehicle is loaded or unloaded, a configuration in which the operation of only the meter device 2 may be employed.

As described in "Background", the meter device 2 or the center display device 3 is required to switch the operation state depending on the case where the ignition system 19 is in the on-state or the case where the ignition system 19 is in the off-state. For example, in the case where the ignition system 19 is in the on-state, it is required that display for showing the vehicle state such as the speed is performed. In the case where the ignition system 19 is in the off-state, it is required that the so-called as welcome display such as display for showing a vehicle logo or the like is performed when a door of the vehicle is opened.

As described above, for each of a case of the meter device 2 and the center display device 3 and a case of the infotainment device 4, the requirements and the characteristics are different depending on the case of the meter device 2 and the center display device 3 or the case of the infotainment device 4. Therefore, also for each of a case of the display control portion 16 controlling the operations of the meter device 2 and the center display device 3 and a case of the infotainment control portion 17 controlling the operation of the infotainment device 4, the requirements and the characteristics are different depending on the case of the display control portion 16 or the case of the infotainment control portion 17. FIG. 5 shows the requirements and the characteristics required for each of the display control portion 16 and the infotainment control portion 17.

The meter device 2 and the center display device 3 as the control target are connected so as to receive the power source supply from both of the ignition system 19 and the battery system 20 described above. Therefore, similarly to the meter device 2 and the center display device 3, the display control portion 16 is required to be capable of receiving the power source supply from both of the ignition system 19 and the battery system 20. Furthermore, the display control portion 16 is required to have an operation voltage equal to 4 volts or more and an operation current equal to 2 amperes (amps) or less. Generally, an inrush current with driving of a starter motor causes decrease of the voltage supplied to each of the power source supply systems inside the vehicle when an engine is cranked. However, the meter device 2 and the center display device 3 may be essential to promptly perform the display in parallel with a cranking operation. Therefore, a lower limit value of the operation voltage of the display control portion 16 is set to be lower than the operation voltage of the infotainment control portion 17 described later. The meter device 2 and the display device 3 may be prioritized to have the high quality rather than upgrade in accordance with consumer technical demand and generation technical advance. Therefore, the display control portion 16 may be desired to have the high quality.

By contrast, the infotainment device 4 as the control target is connected so as to receive the power source supply from only the battery system 20 described above. Therefore, similarly to the infotainment device 4, the infotainment control portion 17 is required to be capable of receiving the power source supply from only the battery system 20. Furthermore, the infotainment control portion 17 is required to have an operation voltage equal to 10 volts or more and an operation current equal to 15 amps or less. The infotainment device 4 may be prioritized to upgrade in accordance with the consumer technical demand and the generation technical advance rather than have the high quality. Therefore, the infotainment control portion 17 may be desired to easily upgrade in accordance with the consumer technical demand and the generation technical advance.

The ignition power source input terminal 24 is connected to an anode terminal of a diode 27 inside the vehicle control apparatus 1. A cathode terminal of the diode 27 is connected to an input side of a step-up-down circuit 30 and an input side of a step-down circuit 31 via common connection points 28 and 29. The battery power supply input terminal 26 is connected to an anode terminal of a diode 32 inside the vehicle control apparatus 1, and is connected to an input side of a step-down circuit 34. A cathode terminal of the diode 32 is connected to the input side of the step-up-down circuit 30 and the input side of the step-down circuit 31 via the common connection points 28 and 29. The diodes 27 and 32 configure a diode OR circuit 33. The output voltage of the diode 27 and the output voltage of the diode 32 are selectively applied to the step-up-down circuit 30 and the step-down circuit 31. The voltage of the battery power source +B is directly applied to the step-down circuit 34. A part including the power source supply system from the battery 18 to the vehicle control apparatus 1 configures a power source supply circuit 35.

A power source input terminal of the microcomputer 15 is connected to an output side of the step-up-down circuit 30, and the microcomputer 15 operates based on, as the operation power source, the stepped-up output power source from the step-up-down circuit 30. A power source input terminal of the display control portion 16 is connected to an output side of the step-down circuit 31, and the display control portion 16 operates based on, as the operation power source, the stepped-down output power source from the step-down circuit 31. A power source input terminal of the infotainment control portion 17 is connected to an output side of the step-down circuit 34, and the infotainment control portion 17 operates based on, as the operation power source, the stepped-down output power source from the step-down circuit 34.

The microcomputer 15 includes two cores 36 and 37 (corresponding to resources) as hardware configurations. The microcomputer 15 includes, as software configurations, a real time operating system (hereinafter, also referred to as a RTOS) 38 (corresponding to a safety type OS) executed by the cores 36 and 37, a general purpose operating system (hereinafter, also referred to as a general purpose OS) 39 (corresponding to a non-safety type OS), a meter application 40 (corresponding to a safety type application) activated by the RTOS 38, an infotainment application 41 (corresponding to a non-safety type application) activated by the general purpose OS 39, and a HMI 42 common to the meter application 40 and the infotainment application 41. The general purpose OS 39 corresponds to, for example, Linux (registered trademark), or the like. The infotainment application 41 corresponds to an application including a car navigation application or an audio application.

In the microcomputer 15, the RTOS 38 and the general purpose OS 39 are associated with the two cores 36 and 37 by a virtualization module 43. The virtualization module 43 associates the RTOS 38 and the general purpose OS 39 with the cores 36 and 37 so that the cores 36 and 37 operate when the RTOS 38 activates the meter application 40, and the cores 36 and 37 operate when the general purpose OS 39 activates the infotainment application 41. That is, the virtualization module 43 executes a virtualization process so as to exhibit both of a process capability of the core 36 and a process capability of the core 37 when any of the meter application 40 or the infotainment application 41 is activated. The RTOS 38 activates the meter application 40, and thereby the microcomputer 15 outputs the command to the display control portion 16 as described above. The display control portion 16 transmits the control signal or the image signal to the meter device 2 and the center display device 3. The general purpose OS 39 activates the infotainment application 41, and thereby the microcomputer 15 outputs the command to the infotainment control portion 17 as described above. The infotainment control portion 17 transmits the control signal to the infotainment device 4.

A domain (corresponding to an area shown by a long dashed double-dotted A1 in FIG. 2) includes as the configuration elements, the core 36 of the microcomputer 15, the RTOS 38, the meter application 40, the HMI 42, the virtualization module 43, the display control portion 16, the step-up-down circuit 30, and the step-down circuit 31. The domain corresponds to a safety type domain. By contrast, a domain (corresponding to an area shown by a long dashed double-dotted A2 in FIG. 2) includes, as the configuration elements, the core 37 of the microcomputer 15, the general purpose OS 39, the infotainment application 41, the HMI 42, the virtualization module 43, the infotainment control portion 17, and the step-down circuit 34. The domain corresponds to a non-safety type domain. In such a meter, by utilizing a technology of associating the cores 36 and 37 with the RTOS 38 and the general purpose OS 39 inside the microcomputer 15 and performing the virtualization, the RTOS 38 that executes the meter application 40 requiring the high quality and the general purpose OS 39 that executes the infotainment application 41 requiring to easily upgrade in accordance with the consumer technical demand and the generation technical advance, coexist on the microcomputer 15. A high level HMI cooperation may be implemented while minimizing a dependence relation between each of the domains.

A configuration in which the vehicle control apparatus controlling the operations of the meter device 2 and the center display device 3 and the vehicle control apparatus controlling the operation of the infotainment device 4 are simply integrated is assumed as a comparative configuration. Differences between the configuration of the present embodiment shown in FIG. 2 and the configuration of the comparative configuration will be described.

Figure 6:
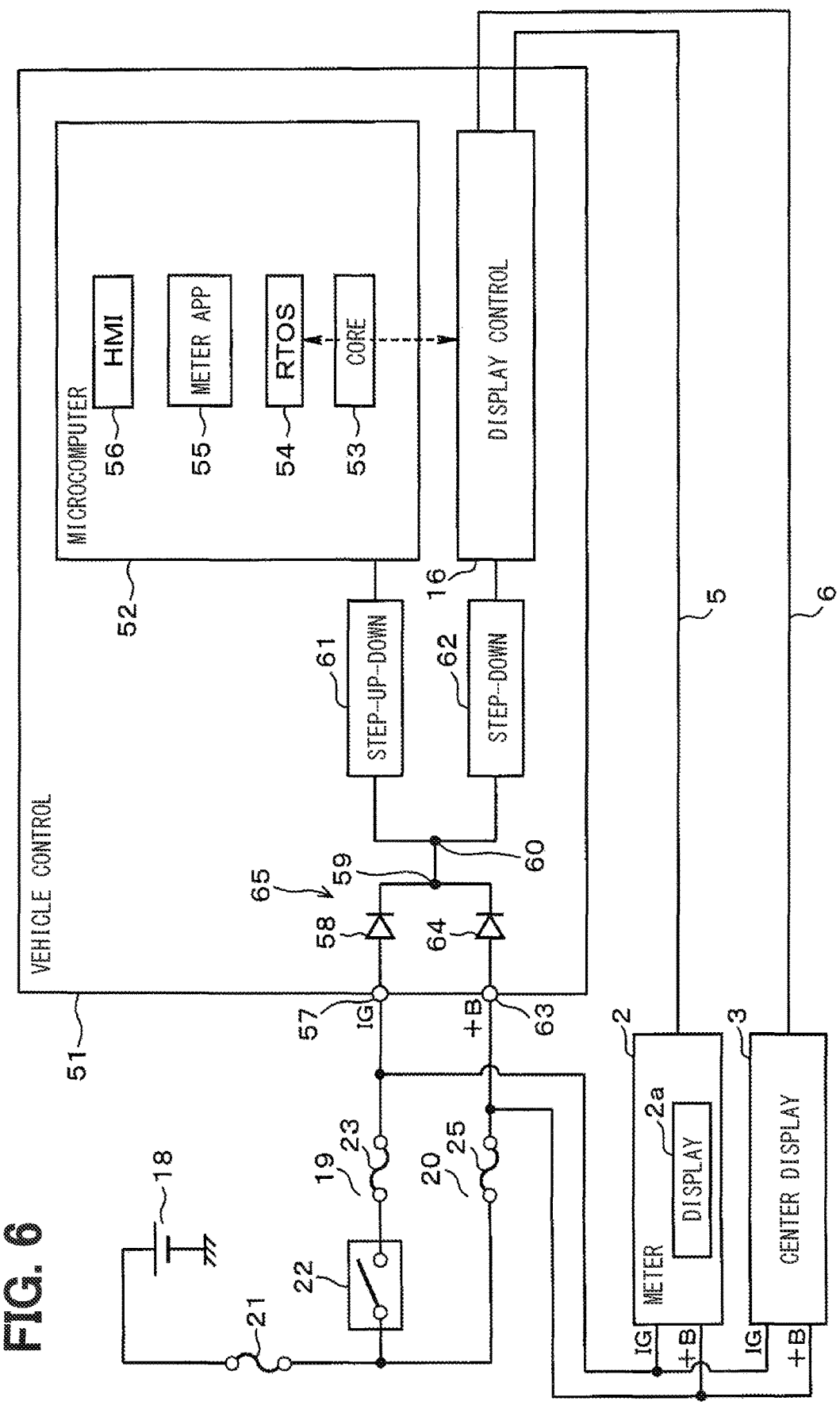
FIG. 6 is a functional block diagram of the vehicle control apparatus that controls an operation of a meter device.

As shown in FIG. 6, a vehicle control apparatus 51 controlling the operations of the meter device 2 and the center display device 3 includes a microcomputer 52 and the display control portion 16. The microcomputer 52 is different from the microcomputer 15 described above. The microcomputer 15 includes a core 53 as the hardware configuration, and includes a RTOS 54 executed by the core 53, a meter application 55 activated by the RTOS 54, and a HMI 56 specialized in the meter control as the software configuration.

As a power source supply system from the battery 18 to the vehicle control apparatus 51, similarly to the vehicle control apparatus 1 described above, the two power source supply systems 19 and 20 of the ignition system 19 and the battery system 20 are placed. The ignition system 19 is connected to an ignition power source input terminal 57 of the vehicle control apparatus 51, the meter device 2, and the center display device 3. The ignition power source input terminal 57 is connected to a step-up-down circuit 61 and a step-down circuit 62 via a diode 58 and common connection points 59 and 60. The battery system 20 is connected to a battery power source input terminal 63 of the vehicle control apparatus 51, the meter device 2, and the center display device 3. The battery power source input terminal 63 is connected to the step-up-down circuit 61 and the step-down circuit 62 via a diode 64 and the common connection points 59 and 60. Even in such a configuration, it is necessary to support the two power source supply systems of the ignition system 19 and the battery system 20. Therefore, the diodes 58 and 64 configure a diode OR circuit 65. Since the operation voltage of the display control portion 16 is low, the step-up-down circuit 61 capable of stepping up is utilized. When being converted by the battery voltage of 12V, a necessary electric power for the operations of the microcomputer 52 and the display control portion 16 is 2 amps or less. Therefore, even when variations of forward voltages of the diodes 58 and 64 cause current concentration, disconnections of the fuses 23 and 25 in the vehicle side do not happen.

Figure 7:
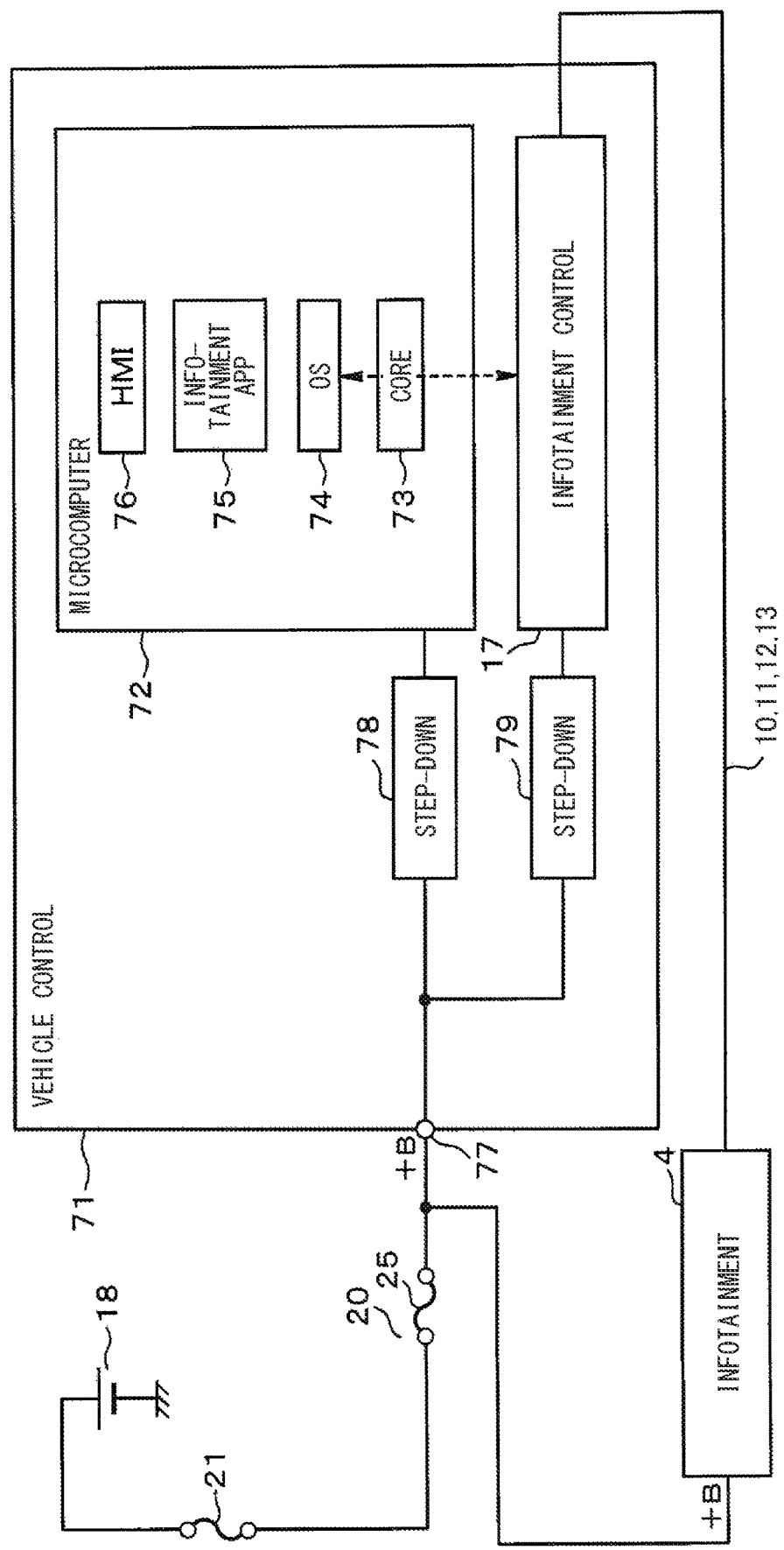
FIG. 7 is a functional block diagram of the vehicle control apparatus that controls an operation of an infotainment device.

As shown in FIG. 7, a vehicle control apparatus 71 controls the operation of the infotainment device 4, and includes a microcomputer 72 and the infotainment control portion 17. The microcomputer 72 is different from the microcomputer 15 described above. The microcomputer 72 includes a core 73 as the hardware configuration, and includes a general purpose OS 74 executed by the core 73, an infotainment application 75 activated by the general purpose OS 74, and a HMI 76 specialized in infotainment control as the software configuration.

A power source supply system from the battery 18 to the vehicle control apparatus 71 is different from the configurations of the vehicle control apparatuses 1 and 51 described above. Only the battery system 20 is placed. The battery system 20 is connected to a battery power source input terminal 77 of the vehicle control apparatus 71 and the infotainment device 4. The battery power source input terminal 77 is connected to step-down circuits 78 and 79. In such a configuration, since it may be necessary to support one power source supply system of the battery system 20, the diode OR circuits shown in FIG. 2 and FIG. 6 may be unnecessary. The step-up circuit may be unnecessary since the operation voltage of the infotainment control portion 17 is high.

Figure 8:
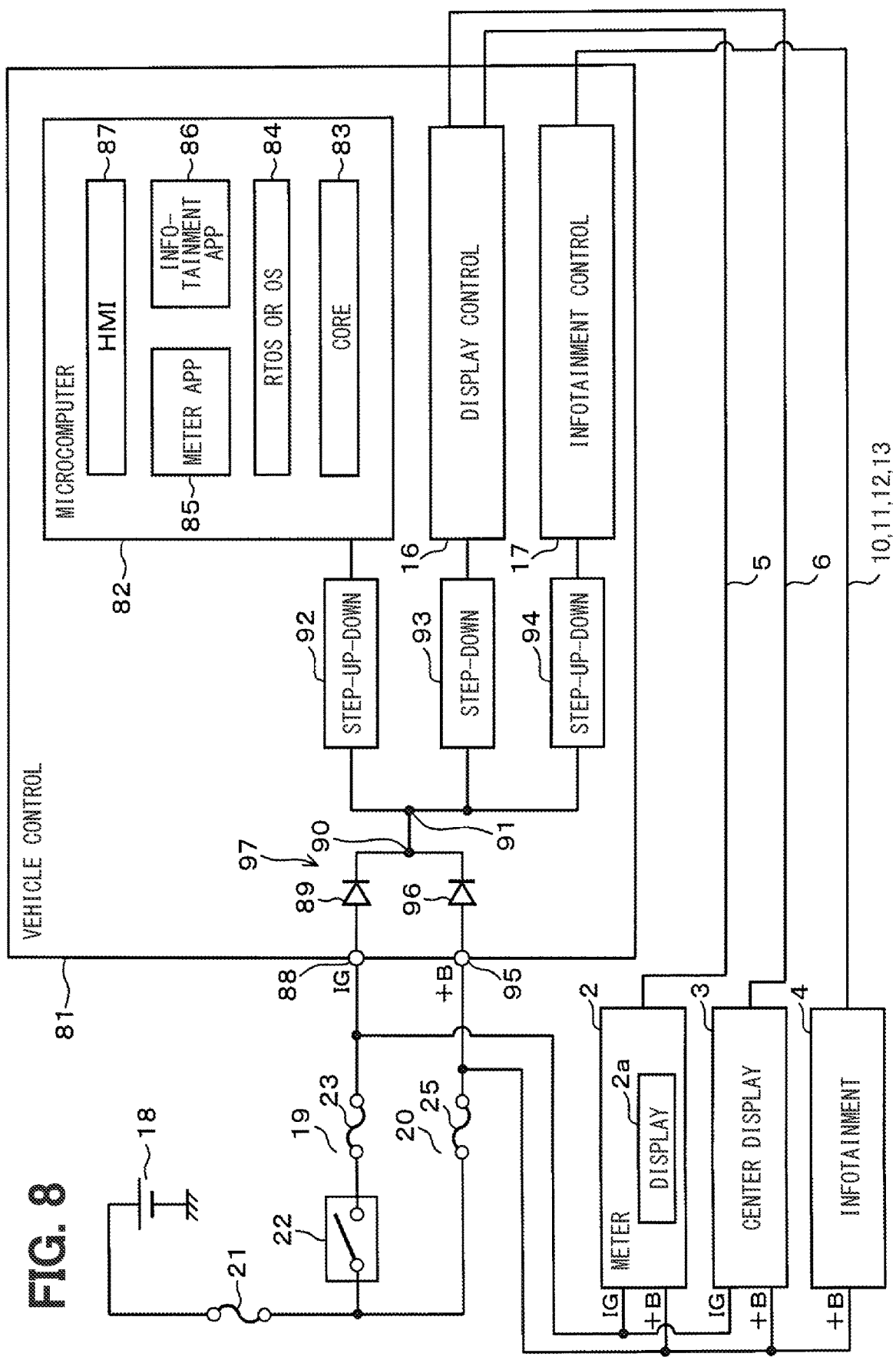
FIG. 8 is a functional block diagram of a comparative example.

FIG. 8 shows a configuration assumed when the vehicle control apparatus 61 shown in FIG. 6 and the vehicle control apparatus 71 shown in FIG. 7 are simply integrated. A vehicle control apparatus 81 includes a microcomputer 82, the display control portion 16, and the infotainment control portion 17. The microcomputer 82 is different from the microcomputer 15 described above. The microcomputer 82 includes, as the hardware configuration, a core 83 and includes, as the software configuration, an OS 84 including a RTOS executed by the core 83 executed by the core 83 or a general purpose OS executed by the core 83, a meter application 85 and an infotainment application 86 that are activated by the OS 84, and a HMI 87 specialized in both of the meter control and the infotainment control.

As a power source supply system from the battery 18 to the vehicle control apparatus 81, similarly to the vehicle control apparatuses 1 and 51 described above, the two power source supply systems 19 and 20 of the ignition system 19 and the battery system 20 are placed. The ignition system 19 is connected to an ignition power source input terminal 88 of the vehicle control apparatus 81, the meter device 2, and the center display device 3. The ignition power source input terminal 88 is connected to a step-up-down circuit 92, a step-down circuit 93, and a step-up-down circuit 94 via a diode 89 and common connection points 90 and 91. The battery system 20 is connected to a battery power source input terminal 95 of the vehicle control apparatus 81, the meter device 2, the center display device 3, and the infotainment device 4. The battery power source input terminal 95 is connected to the step-up-down circuit 92, the step-down circuit 93, and the step-up-down circuit 94 via a diode 96 and the common connection points 90 and 91. The diodes 89 and 96 configure a diode OR circuit 97.

The configuration shown in FIG. 8 has the following various difficulties from (A) to (E).

(A) When variations of forward voltage drops of the diodes 89 and 96 cause current concentration, a current equal to 2 amps or more (15 amps at the maximum) flows to an output side of the diode OR circuit 97. Therefore, the fuse 23 in the vehicle side is disconnected, and a disconnection state may occur.

(B) The cost and the size increase since a 15 ampere rating as the diode 96 is necessary.

(C) The step-up-down circuit 94 that is able to step up and supports a large current in the input side of the infotainment control portion 17 is necessary since the voltage decrease may occur due to the forward voltage drops of the diodes 89 and 96. Therefore, the cost and the size increase.

(D) The power source supply system to the display control portion 16 and the power source supply system to the infotainment control portion 17 are common. Therefore, when a difficulty occurs in the infotainment control portion 17, the difficulty is derived to the display control portion 16 and an operation malfunction of the meter device 2 or the center display device 3 may be caused. Specifically, for example, when the infotainment control portion 17 is damaged due to an overcurrent, both of the fuse 23 of the ignition system 19 and the fuse 25 of the battery system 20 are disconnected and the disconnection state occurs. Thereby, operation stop of the meter device 2 or the center display device 3 may be caused.

(E) The display control portion 16 may be desired to have the high quality since the meter device 2 and the display device 3 may be prioritized to have the high quality rather than upgrade in accordance with the consumer technical demand and the generation technical advance. By contrast, the infotainment device 4 may be prioritized to upgrade in accordance with the consumer technical demand and the generation technical advance rather than have the high quality. Therefore, the infotainment control portion 17 may be desired to easily upgrade in accordance with the consumer technical demand and the generation technical advance. However, it may be difficult to compatibly provide the high quality and ease of the upgrade in accordance with the consumer technical demand and the generation technical advance since the OS 84 installed in the microcomputer 82 corresponds to the RTOS or the general purpose OS.

The vehicle control apparatus 1 in the present embodiment has the internal configuration shown in FIG. 2, and thereby solves the various difficulties from (A) to (E) described above. That is, inside the vehicle control apparatus 1, the safety type domain and the non-safety type domain are physically separated. The function block that is essential to receive the power source supply by the ignition system 19 is placed in the safety type domain. Thereby, the diode having the 15 ampere rating is unnecessary while reducing the current flowing to the output side of the diode OR circuit 33. The difficulties of (A) and (B) are solved.

The function block that is not essential to receive the power source supply by the ignition system 19 is placed in the non-safety type domain. Thereby, the step-up-down circuit that supports the large current is unnecessary in the input side of the infotainment control portion 17. The difficulty of (C) is solved.

A supply manner of the operation power source from the ignition system 19 and the battery system 20 to the display control portion 16 and a supply manner of the operation power source to the infotainment control portion 17 are different from each other. The display control portion 16 receives the power source supply from both of the ignition system 19 and the battery system 20. The infotainment control portion 17 receives the power source supply from only the battery system 20. Thereby, even when the difficulty occurs in the infotainment control portion 17, an occurrence of a situation where the difficulty occurs in the display control portion 16 may be avoided in advance. The difficulty of (D) is solved.

The virtualization technology is utilized inside the microcomputer 15, and the RTOS 38 implementing the high quality and the general purpose OS 39 easily implementing the upgrade in accordance with the consumer technical demand and the generation technical advance coexist in the microcomputer 15. Thereby, it may be possible to provide the high-level cooperation while minimizing the necessary dependence relation between the safety type domain and the non-safety type domain. The difficulty of (E) is solved.

As described above, according to the first embodiment, it may be possible to provide the effects shown below.

In the vehicle control apparatus 1, while the display control portion 16 controlling the operation of the meter device 2 or the center display device 3 and the infotainment control portion 17 controlling the operation of the infotainment device 4 are integrated, the display control portion 16 receives the operation power source from both of the ignition power source input terminal 24 and the battery power supply input terminal 26. It may be possible to appropriately integrate the control function of the meter device 2 or the center display device 3 into the infotainment device 4 while maintaining the required operation of the meter device 2 or the center display device 3

In the vehicle control apparatus 1, the display control portion 16 and the infotainment control portion 17 are integrated. It may be possible to integrate the HMI function for the meter device 2 or the center display device 3 and the HMI for the infotainment device 4. It may be possible to implement the higher-level HMI function compared with the configuration in which the display control portion 16 and the infotainment control portion 17 are separated from each other.

In the vehicle control apparatus 1, a supply manner of the operation power source from both of the ignition system 19 and the battery system 20 to the meter device 2 or the center display device 3 is same as a supply manner of the operation power source to the display control portion 16. For example, when the operation power source to the meter device 2 or the center display device 3 is in a supply state, it may be possible to avoid, in advance, an occurrence of a situation where the operation power source to the display control portion 16 is in a non-supply state. It may be possible to appropriately ensure the operation of the meter device 2 or the center display device 3.

In the vehicle control apparatus 1, the supply manner of the operation power source from the ignition system 19 and the battery system 20 to the meter device 2 or the center display device 3 is different from a supply manner of the operation power source to the infotainment device 4. In accordance with the difference, the supply manner of the operation power source from the ignition system 19 and the battery system 20 to the display control portion 16 is different from a supply manner of the operation power source to the infotainment control portion 17. It may be possible to match the supply manner of the operation power source between the same type in-vehicle instrument and the same type instrument control portion.

In the vehicle control apparatus 1, inside the microcomputer 15, the RTOS 38 and the general purpose OS 39 are associated with the two cores 36 and 37 by the virtualization module 43. The RTOS 38 implementing the high quality and the general purpose OS 39 easily implementing the upgrade in accordance with the consumer technical demand and the generation technical advance coexist in the microcomputer 15. It may be possible to implement the high-level HMI cooperation while minimizing the necessary dependence relation between the safety type domain and the non-safety type domain. That is, the required requirements and the required characteristics are different between the safety type domain and the non-safety type domain as described above. Therefore, even when the difficulty occurs in one domain, it is necessary to avoid the situation where the difficulty is derived to the other domain and minimize the necessary dependence relation. In this regards, the RTOS 38 requiring to easily update in accordance with the consumer technical demand and the generation technical advance coexist, and the virtualization module 43 is placed. Thereby, for example, when an abnormality occurs in the general purpose OS 39, it may be possible to maintain the operation of the RTOS 38 regardless the abnormality of the general purpose OS 39 by shutting down only the general purpose OS 39 and restarting the general purpose OS 39. When the output voltage of the battery 18 decreases, the infotainment device 4 stops operating. However, since the infotainment device 4 stops operating, only the general purpose OS 39 may execute a backup process. It may be possible to avoid a situation where the RTOS 38 executes the backup process.

In the vehicle control apparatus 1, the fuse 25 is detached. Thereby, it may be possible to appropriately secure the operation power source of the meter device 2 or the center display device 3 while interrupting the supply route of the power source by the battery system 20 and preventing the battery from being increased due to the dark current.

Second Embodiment

Figure 9:
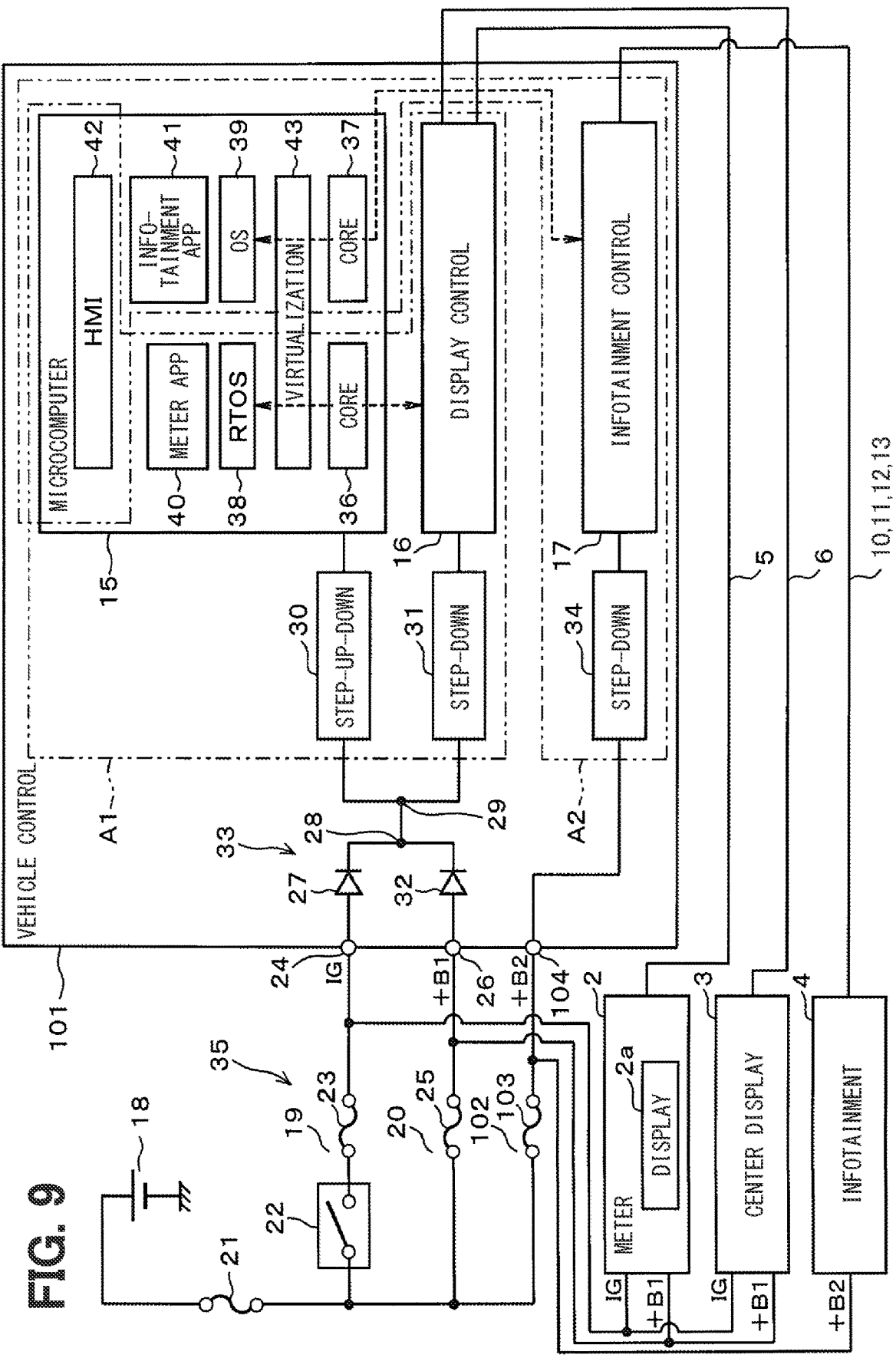
FIG. 9 is a functional block diagram showing the internal configuration of the vehicle control apparatus and the power source supply system according to a second embodiment.

A second embodiment will be described with reference to FIG. 9. Hereinafter, the description of the same parts as those in the first embodiment will be omitted, and only different parts will be described. The second embodiment includes another battery system in addition to the battery system 20 described in the first embodiment.

As a power source supply system from the battery 18 to a vehicle control apparatus 101, a battery system 102 is placed in addition to the ignition system 19 and the battery system 20. The battery system 20 is connected to the battery power supply input terminal 26 of the vehicle control apparatus 101, the meter device 2, and the center display device 3. The battery system 102 includes a detachable fuse 103 (corresponding to a third energization member), and is connected to a battery power source input terminal 104 (corresponding to a third power source input portion) of the vehicle control apparatus 101, and the infotainment device 4. In this configuration, the battery system 20 corresponds to a branch system and a one second power source supply system. The battery system 102 corresponds to the branch system and the other second power source supply system.

The battery power source input terminal 104 is connected to the step-down circuit 34 inside the vehicle control apparatus 101. That is, regardless of whether the user switches the key switch to any operation state, only on a condition that the fuses 21 and 103 are normally installed to be in the energization state, the voltage of the battery power source +B2 is applied to the battery power source input terminal 104 of the vehicle control apparatus 101 and the infotainment device 4. In the first embodiment, the battery system 20 to the meter device 2 and the center display device 3 and the battery system 20 to the infotainment device 4 are commonly placed. In the second embodiment, the battery system 20 to the meter device 2 and the center display device 3 and the battery system 102 to the infotainment device 4 are separately placed. That is, also in the present embodiment, the fuse 25 of the battery system 20 is detached, and thereby a power source supply route from the battery 18 to the in-vehicle instrument can be interrupted. The battery can be prevented from increasing due to the dark current. An operation power source for the meter device 2 or the center display device 3 can be securable. The operation of the meter device 2 or the center display device 3 can be performed when the vehicle self-travels. In the present embodiment, even when the fuse 25 of the battery system 20 is detached, it may be possible to secure the operation power source of the infotainment device 4 by maintaining attachment of the fuse 103 of the battery system 102.

According the second embodiment, the similar operation effects with the first embodiment can be obtained. For example, when the vehicle is transported by the ship as described in the first embodiment, it may be possible to detach the fuse 25 while the fuse 103 is attached. That is, it may be possible to maintain the electric power supply to the infotainment device 4 connected to the battery system 102 while reducing the dark current during the transportation. Thereby, for example, the other in-vehicle instrument required to operate during the vehicle transportation may be able to utilize a control function such as an audio output of the infotainment device 4.

OTHER EMBODIMENTS

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

The safety type in-vehicle instrument is not limited to the meter device 2 or the center display device 3, and may be any instrument that satisfies a condition requiring the safety and the security rather than the convenience and the comfort. The safety type instrument control portion is not limited to the display control portion 16 controlling the operation of the meter device 2 or the center display device 3, and may be any control portion controlling an operation of the instrument that satisfies the described above condition. The non-safety type in-vehicle instrument is not limited to the infotainment device 4, and may be any instrument that satisfies a condition requiring the convenience or the comfort rather than the safety or the security. The non-safety type in-vehicle instrument may be, for example, the navigation instrument. The non-safety type instrument control portion is not limited to the infotainment control portion 17 controlling the operation of the infotainment device 4, and may be any control portion controlling an operation of an instrument that satisfies a described above condition. The non-safety type instrument control portion may be any control portion controlling an operation of, for example, the car navigation device or the audio device.

The configuration in which one safety type instrument control portion and one non-safety type instrument control portion are integrated is exemplified. However, a configuration in which one or more safety type instrument control portions and one or more non-safety type instrument control portions are integrated may be employed.

The energization member is not limited to the fuses 23, 25, and 103, and may be any member having the equivalent function to the fuse. The energization member may be any member having a configuration that connects the supply route of the power source when being attached and that interrupts the supply route of the power source when being not attached.

The invention claimed is:

1. A vehicle control apparatus comprising:
    a first power source input portion connected to a first power source supply system configured to receive power source supply in cooperation with an ignition state of a vehicle;
    a second power source input portion connected to a second power source supply system configured to receive the power source supply regardless of the ignition state; and
    a microcomputer configured to output a first command relating to an operation of a first in-vehicle instrument that is connected to both of the first power source supply system and the second power source supply system and a second command relating to an operation of a second in-vehicle instrument that is not connected to the first power source supply system and is connected to the second power source supply system,
    wherein:
    the microcomputer receives an operation power source from both of the first power source input portion and the second power source input portion.

2. The vehicle control apparatus according to claim 1, further comprising:
    a first instrument control portion configured to control the operation of the first in-vehicle instrument in accordance with the first command output from the microcomputer; and
    a second instrument control portion configured to control the operation of the second in-vehicle instrument in accordance with the second command output from the microcomputer.

3. The vehicle control apparatus according to claim 2, wherein:
    the first instrument control portion receives the operation power source from both of the first power source input portion and the second power source input portion.

4. The vehicle control apparatus according to claim 2, wherein:
    the second instrument control portion receives the operation power source from the second power source input portion.

5. The vehicle control apparatus according to claim 3, wherein:
    the second power source supply system includes at least two branch systems and a third power source input portion connected to one of the at least two branch systems;
    the second instrument control portion receives the operation power source from the third power source input portion; and
    the second power source input portion is connected to a branch system of the at least two branch systems different from a branch system of the at least two branch systems connected to the third power source input portion.

6. The vehicle control apparatus according to claim 2, wherein:
    the first instrument control portion controls an operation of a safety type in-vehicle instrument having a characteristic requiring safety or security rather than convenience or comfort as the first in-vehicle instrument; and
    the second instrument control portion controls an operation of a non-safety type in-vehicle instrument having a characteristic requiring the convenience or the comfort rather than the safety or the security as the second in-vehicle instrument.

7. The vehicle control apparatus according to claim 6, wherein:
    the first instrument control portion corresponds to a display control portion configured to perform a vehicle information display control of a display instrument configured to display an image as the safety type in-vehicle instrument; and
    the second instrument control portion corresponds to a function control portion configured to perform an application function control of an application execution instrument configured to execute the application as the non-safety type in-vehicle instrument.

8. The vehicle control apparatus according to claim 7, wherein:
    the first instrument control portion performs the display control of a plurality of the display instruments.

9. The vehicle control apparatus according to claim 2, wherein:
    the first instrument control portion and the second instrument control portion are integrated.

10. The vehicle control apparatus according to claim 2, wherein:
    the first instrument control portion receives the operation power source from the first power source input portion and the second power source input portion via a diode OR circuit.

11. The vehicle control apparatus according to claim 2, wherein:
    the operation portion receives the operation power source from the first power source input portion and the second power source input portion via a step-up-down circuit; and
    the second instrument control portion receives the operation power source from the second power source input portion via a step-down circuit.

12. The vehicle control apparatus according to claim 2, wherein:
    the operation portion
        causes a first operating system executed on a resource to activate a first control application corresponding to the first instrument control portion,
        causes a second operating system executed on the resource to activate a second control application corresponding to the second instrument control portion, and
        causes a virtualization module to associate the first operating system and the second operating system with the resource.

13. A vehicle control apparatus comprising:
    a first power source input portion connected to a first power source supply system configured to receive power source supply in cooperation with an ignition state of a vehicle;

a second power source input portion connected to a second power source supply system configured to receive the power source supply regardless of the ignition state; and a microcomputer configured to output a first command by causing a first operating system executed on a resource to activate a first control application corresponding to an operation of a first in-vehicle instrument that is connected to both of the first power source supply system and the second power source supply system and to output a second command by causing a second operating system executed on the resource to activate a second control application corresponding to an operation of a second in-vehicle instrument that is not connected to the first power source supply system and is connected to the second power source supply system;

a first instrument control portion configured to control the operation of the first in-vehicle instrument in accordance with the first command; and a second instrument control portion configured to control the operation of the second in-vehicle instrument in accordance with the second command, wherein the microcomputer receives an operation power source from both of the first power source input portion and the second power source input portion.

* * * * *